United States Patent Office 2,782,176
Patented Feb. 19, 1957

2,782,176

HALOGEN CONTAINING VINYLIDENE RESINS STABILIZED WITH A MIXTURE OF ZINC AND CALCIUM SALTS OF PHENYL CARBOXYLIC ACIDS

Joseph R. Darby, Webster Groves, and Leo D. Frederickson, Jr., St. Louis, Mo., assignors to Monsanto Chemical Company, St. Louis, Mo., a corporation of Delaware No Drawing. Application May 14, 1951,
Serial No. 226,296

13 Claims. (Cl. 260—30.6)

This invention relates to the stabilization of halogen-containing resin compositions. More particularly this invention relates to preventing the deterioration of halogen-containing resins at elevated temperatures.

As is well known to those skilled in the art, halogen-containing resins and particularly halogen-containing vinylidene resins are subject to deterioration on exposure to elevated temperatures. Numerous materials have been suggested for incorporation in such resins to prevent or minimize such deterioration. However, relatively few of these stabilizing agents have proved to be particularly effective.

It is an object of this invention to provide halogen-containing resin compositions having improved resistance to deterioration on aging. A further object of this invention is to provide halogen-containing vinylidene resin compositions having increased resistance to deterioration at elevated temperatures. A particular object of this invention is to provide vinyl chloride polymer compositions having increased heat stability.

According to this invention halogen containing resin compositions having improved stability are obtained by incorporating a mixture of a calcium salt of a phenyl carboxylic acid and a zinc salt of a phenyl carboxylic acid in a halogen-containing resin composition.

The following examples are illustrative of the invention but are not to be considered as limitative thereof. Where parts are mentioned, they are parts by weight.

The compositions in the examples set forth in the table below are prepared by mixing 100 parts of polyvinyl chloride, 50 parts of 2-ethyl hexyl diphenyl phosphate and the indicated calcium and zinc salts in the amounts set forth. The several ingredients are mixed on differential speed rolls at a roll temperature of 170° C. to form a homogeneous composition which is removed from the rolls in the form of crude sheets. From the crude sheets there are molded finished sheets which are about 0.020 inch in thickness using a molding cycle of one minute at 170° C.

TABLE I

| Example | Calcium Benzoate (Parts) | Zinc Benzoate (Parts) | Color after 20 minutes at 160° C. |
|---|---|---|---|
| I | 30 | 0.5 | Very slight yellow. |
| II | 30 | 1.0 | Slight yellow. |

In contrast to the results in Examples I and II, when the zinc benzoate is omitted the resulting compositions turn brown on heating at 160° C. for 20 minutes. Similarly when the calcium benzoate is omitted from the compositions of Examples I and II, the resulting products are dark colored on heating under the same conditions. The compositions in Examples I and II are essentially colorless prior to such heat exposure.

*Example III*

A plasticized composition containing 100 parts of polyvinyl chloride and 50 parts of di-octyl phthalate is stabilized by incorporating therein 5 parts of calcium benzoate and 0.1 part of zinc benzoate. The resulting composition possesses heat stability characteristics similar to those of the products of Examples I and II. Thus this composition possesses stability vastly superior to that of otherwise identical compositions in which either the calcium benzoate or the zinc benzoate is omitted.

*Example IV*

Example III is repeated except that 1 part of calcium benzoate and 3 parts of zinc benzoate are employed. The resulting composition exhibits improved stability characteristic of the products of this invention.

*Example V*

Example III is repeated except that the plasticized composition is stabilized by incorporating therein 3 parts of calcium phthalate and 1 part of zinc phthalate. Improved stability results are obtained in comparison with otherwise identical compositions in which either calcium phthalate or zinc phthalate is omitted.

*Example VI*

Example III is repeated except that the stabilizer mixture is made up of 2 parts of calcium benzoate and 2 parts of zinc phthalate.

*Example VII*

Example III is repeated except that the stabilizer mixture is made up of 1 part of calcium phthalate and 2 parts of zinc benzoate.

*Example VIII*

Example III is repeated except that the stabilizer mixture is made up of 3 parts of calcium salicylate and 0.5 part of zinc salicylate.

*Example IX*

Example III is repeated except that the stabilizer mixture is made up of 3 parts of calcium phenyl acetate and 3 parts of zinc phenyl acetate.

*Example X*

Example III is repeated except that the stabilizer mixture is made up of 3 parts of a zinc salt of para-toluic acid and 3 parts of the calcium salt of para-toluic acid.

The products of Examples VI to X exhibit stabilities characteristic of the products of this invention.

*Example XI*

A copolymer of 90 parts vinyl chloride and 10 parts vinyl acetate is stabilized by incorporating therein 3 parts of calcium benzoate and 0.5 part of zinc benzoate for every 100 parts of copolymer. The resulting composition possesses heat stability characteristics similar to those of the product of Example I and vastly superior to otherwise identical products in which either the calcium benzoate or the zinc benzoate is omitted.

*Example XII*

A plasticized composition containing 100 parts of a copolymer made from 90 parts vinyl chloride and 10 parts vinylidene chloride, and 50 parts of di-octyl phthalate is stabilized by incorporating therein 3 parts of calcium benzoate and 0.5 part of zinc benzoate. The resulting composition possesses improved heat stability characteristics typical of the products of this invention.

Example XIII

Results similar to those obtained in Example XII are also obtained when the copolymer of vinyl chloride and vinylidene chloride therein is replaced by an equal amount of a copolymer of 85 parts vinyl chloride and 15 parts diethyl maleate.

As indicated by the examples there may be used zinc and calcium salts of various phenyl carboxylic acids such as ortho, meta and para-toluic acid, phenyl acetic acid, any of the several dimethyl benzoic acids, $\beta$-phenyl propionic acid, any of the amino benzoic acids, $\beta$-phenyl-$\alpha$-amino propionic acid, $\beta$-phenyl-$\beta$-amino-propionic acid, o-amino-$\beta$-phenyl propionic acid, salicylic acid, m-hydroxy benzoic acid, p-hydroxy-benzoic acid, $\beta$-p-hydroxy phenyl propionic acid, polyhydroxy benzoic acids such as 3,4-di-hydroxy benzoic acid, vanillic acid, gallic acid, gallotannic acid, phenyl glycollic acid, o-hydroxy methyl benzoic acid, $\alpha$-phenyl-$\beta$-hydroxy propionic acid, phenyl glyoxylic acid, benzoyl acetic acid, phthalic acid, isophthalic acid, 5-methyl isophthalic acid, terephthalic acid, 2,5-hydroxy terephthalic acid, etc.

Preferably the salts are neutral salts, i. e., the zinc or calcium as the case may be is combined in stoichiometric proportions with the phenyl carboxylic acid. Mixed salts of phenyl carboxylic acids may be employed if desired. Mixtures of salts may also be used.

The stabilizer of the invention may be used with halogen-containing resins generally with effective results. Thus there may be used resins made from such vinylidene compounds as vinyl chloride, vinylidene chloride, vinyl chloracetate, chloro styrenes, chloro butadienes, etc. Such vinylidene compounds may be polymerized singly or in a mixture with these or other halogen-containing vinylidene compounds or with vinylidene compounds free from halogen. Among the unsaturated materials free from halogen which may be copolymerized with halogen-containing vinylidene compounds are vinyl esters of carboxylic acids, for example, vinyl acetate, vinyl propionate, vinyl butyrate; vinyl benzoate; esters of unsaturated acids, for example, alkyl acrylates, such as methyl acrylate, ethyl acrylate, propyl acrylate, butyl acrylate, allyl acrylate and the corresponding esters of methacrylic acid; vinyl aromatic compounds, for example, styrene, para-ethyl styrene, divinyl benzene, vinyl naphthalene, alpha-methyl styrene; dienes, such as butadiene, unsaturated amides, such as acrylic acid amide, acrylic acid anilide; unsaturated nitriles, such as acrylic acid nitrile; esters of $\alpha,\beta$-unsaturated carboxylic acids, for example, the methyl, ethyl, propyl, butyl, amyl, hexyl, heptyl, octyl, allyl, methallyl and phenyl esters of maleic, crotonic, itaconic, fumaric acids and the like. The class of copolymers in which a predominant portion i. e., more than 50% by weight, of the copolymer is made from a halogen-containing vinylidene compound such as vinyl chloride represents a preferred class of polymers to be treated according to the invention.

Among the preferred embodiments of the invention is the stabilization of polymers prepared by the copolymerization of vinyl halides, e. g., vinyl chloride with $\alpha,\beta$-unsaturated polycarboxylic acids such as diethyl maleate or other esters of maleic, fumaric, aconitic, itaconic acids, etc. Among the preferred esters of such acids are alkyl esters in which the alkyl group contains not over 8 carbon atoms.

The stabilizer of the invention is also effective when intimately mixed with halogen-containing resins in which part or all of the halogen is introduced into preformed resin, e. g., chlorinated polyvinyl acetate, chlorinated polystyrene, chlorinated polyvinyl chloride, chlorinated natural and synthetic rubbers, rubber hydrochloride, etc.

The stabilizer mixture of the invention is also effective in halogen-containing resins containing halogens other than chlorine, e. g., bromine, fluorine and iodine.

The halogen-containing resins may contain a varying proportion of halogen depending upon the nature of the resin and its contemplated use. However, as indicated above, vinyl chloride polymers in which the proportion of vinyl chloride units amount to 50% or more of the total monomer used in making the polymeric product represents a preferred class of polymers to be stabilized according to the invention.

The amounts of the components of the stabilizer combination of the invention may be substantially varied and still result in surprising improvement in stability. Usually at least 0.1 part of the zinc salt is used in stabilizing 100 parts of a halogen-containing resin for most uses and generally from 0.2 part to 5 parts are employed. Amounts smaller than 0.1 part are effective to a considerable degree and amounts larger than 5 parts may be used, e. g., 10 or more parts with advantageous results.

Usually the amount of the calcium salt is larger than that of the zinc salt. Thus, while smaller amounts have a considerable degree of effectiveness, usually at least 1 part per 100 parts of halogen containing resin is employed and preferably from 2–10 parts although larger amounts, e. g., 15 or more parts may be used advantageously.

The stabilizer combination of the invention is useful in connection with various halogen-containing resins as indicated above. The compositions which are stabilized in accordance with the invention may be either plasticized or unplasticized depending upon the nature of the resin and the results desired. In addition other light and/or heat stabilizers may be included in the compositions, examples of which are well known to those skilled in the art. It is also to be understood that other well known additives may be included such as pigments and other coloring materials, lubricants, resin modifiers and the like.

The stabilizer combination of the invention is of particular importance in stabilizing halogen-containing resins especially vinyl chloride polymers plasticized with phosphate esters such as the alkyl diaryl phosphates in which the alkyl group contains 6–14 carbon atoms and the aryl groups are phenyl or cresyl groups, i. e., ortho-, meta- or paracresyl groups and mixtures thereof, since compositions containing such plasticizers have proved to be especially difficult to stabilize. Examples of such esters include 2-ethylhexyl diphenyl phosphate, 2-ethylhexyl dicresyl phosphate, 2-ethylhexyl phenyl cresyl phosphate, hexyl diphenyl phosphate, hexyl phenyl cresyl phosphate, hexyl dicresyl phosphate, dodecyl diphenyl phosphate, dodecylphenyl cresyl phosphate, dodecyl dicresyl phosphate, etc. Mixtures of such esters may frequently be used advantageously. The amount of the phosphate ester which is used may be substantially varied depending upon the particular ester and upon the particular use which is contemplated for the plasticized composition. Usually however, from 10 to 100 parts of the esters are used for every 100 parts of vinyl chloride-containing resin.

A particular feature of vinyl chloride polymer compositions of the invention plasticized with certain of the phosphate esters set forth above, is their non-toxicity. Thus, in contrast to prior stabilizers, the stabilizer combination of the invention is non-toxic. Thus, by virtue of the present invention compositions are provided which may be processed, e. g., by calendering into thin films without undue discoloration thereof and the resulting films used in the packaging of food and other uses where toxic effects must be avoided.

Of course it is to be understood that the invention is applicable to compositions containing plasticizers other than alkyl diaryl phosphate esters as well as mixtures of such phosphate esters and such conventional plasticizers as di-octyl phthalate, tricresyl phosphate, butyl phthallyl, butyl glycolate, etc. In the case of certain halogen-containing resins no plasticizers are required.

What is claimed is:

1. A composition resistant to the discoloring effects of heat comprising a halogen-containing vinylidene resin and as a stabilizer therefor a zinc salt of a phenyl mono carboxylic acid and a calcium salt of a phenyl carboxylic acid.

2. A composition as defined in claim 1 in which the halogen is chlorine.

3. A composition as defined in claim 2 in which the zinc salt is zinc benzoate and the calcium salt is calcium benzoate.

4. A composition as defined in claim 1 in which the resin is a vinyl chloride polymer.

5. A composition as defined in claim 1 in which the resin is polyvinyl chloride.

6. A composition as defined in claim 1 in which the resin is a vinyl chloride-vinyl acetate copolymer.

7. A composition as defined in claim 1 in which the resin is a vinyl chloride-diethyl maleate copolymer.

8. A heat resistant composition comprising a vinyl halide polymer and as a stabilizer therefor a mixture of zinc benzoate and calcium benzoate.

9. A heat resistant composition comprising a vinyl chloride polymer and as a stabilizer therefor a mixture of zinc benzoate and calcium benzoate.

10. A heat resistant composition comprising polyvinyl chloride, a phosphate ester plasticizer and as a stabilizer therefor a mixture of zinc benzoate and calcium benzoate.

11. A composition as defined in claim 10 in which the phosphate plasticizer is an alkyl diaryl phosphate in which the alkyl group contains from 6 to 14 carbon atoms and the aryl radical is taken from the group consisting of phenyl and cresyl radicals.

12. A composition as defined in claim 9 in which the polymer is a vinyl chloride-vinyl acetate copolymer.

13. A composition as defined in claim 9 in which the polymer is a vinyl chloride-diethyl maleate copolymer.

References Cited in the file of this patent

UNITED STATES PATENTS

| | | |
|---|---|---|
| 2,438,102 | Cox et al. | Mar. 16, 1948 |
| 2,446,976 | Cousins | Aug. 10, 1948 |
| 2,504,120 | Gamrath | Apr. 18, 1950 |
| 2,564,646 | Leistner et al. | Aug. 14, 1951 |

FOREIGN PATENTS

| | | |
|---|---|---|
| 122,130 | Australia | Sept. 12, 1946 |